US008646102B2

(12) United States Patent
Fernando et al.

(10) Patent No.: US 8,646,102 B2
(45) Date of Patent: Feb. 4, 2014

(54) METHOD AND APPARATUS FOR ISSUING RIGHTS IN A DIGITAL RIGHTS MANAGEMENT SYSTEM

(75) Inventors: Gerard M. Fernando, Mountain View, CA (US); Viswanathan Swaminathan, Fremont, CA (US); Thomas W. Jacobs, Cupertino, CA (US); William J. Keenan, Redwood City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1726 days.

(21) Appl. No.: 11/522,270

(22) Filed: Sep. 15, 2006

(65) Prior Publication Data

US 2007/0067851 A1    Mar. 22, 2007

Related U.S. Application Data

(60) Provisional application No. 60/718,064, filed on Sep. 16, 2005.

(51) Int. Cl.
*G06F 17/30*     (2006.01)
*G06F 7/04*      (2006.01)

(52) U.S. Cl.
USPC ............. 726/29; 726/1; 726/2; 726/3; 726/6; 726/7; 726/10; 726/12; 726/26; 726/30; 726/31; 726/32; 726/34; 713/158; 713/165

(58) Field of Classification Search
USPC .................................................. 726/6, 29, 7
See application file for complete search history.

(56) References Cited

U.S. PATENT DOCUMENTS

| | | | | |
|---|---|---|---|---|
| 6,453,305 | B1 * | 9/2002 | Glassman et al. | 705/59 |
| 6,735,699 | B1 * | 5/2004 | Sasaki et al. | 726/28 |
| 2003/0028454 | A1 * | 2/2003 | Ooho et al. | 705/32 |
| 2003/0078891 | A1 * | 4/2003 | Capitant | 705/57 |
| 2005/0138407 | A1 * | 6/2005 | Choudhary | 713/200 |
| 2005/0182931 | A1 * | 8/2005 | Robert et al. | 713/168 |
| 2005/0234830 | A1 * | 10/2005 | Schneider | 705/52 |
| 2005/0273600 | A1 * | 12/2005 | Seeman | 713/160 |
| 2006/0015945 | A1 * | 1/2006 | Fields | 726/27 |
| 2006/0021065 | A1 * | 1/2006 | Kamperman et al. | 726/28 |
| 2006/0021068 | A1 * | 1/2006 | Xu et al. | 726/30 |
| 2006/0259436 | A1 * | 11/2006 | Hug | 705/59 |
| 2006/0272028 | A1 * | 11/2006 | Maes | 726/27 |
| 2007/0112580 | A1 * | 5/2007 | Tang-Talpin et al. | 705/1 |
| 2008/0109882 | A1 * | 5/2008 | Mahalal et al. | 726/5 |
| 2008/0215897 | A1 * | 9/2008 | Doyle et al. | 713/193 |
| 2008/0305738 | A1 * | 12/2008 | Khedouri et al. | 455/3.06 |

* cited by examiner

*Primary Examiner* — Edan Orgad
*Assistant Examiner* — Jenise Jackson
(74) *Attorney, Agent, or Firm* — Park, Vaughan, Fleming & Dowler LLP

(57) ABSTRACT

One embodiment of the present invention provides a system that facilitates issuing rights in a digital rights management system. The system operates by sending a request to perform an operation on an item of content from a client to a rights-management server, wherein the request includes a usage parameter which specifies constraints involved in performing the operation. Next, the system receives a response from the rights-management server, wherein the response indicates whether or not the client has rights to perform the operation in accordance with the constraints specified by the usage parameter. Note that the response may also include a hint that facilitates generating subsequent requests to perform the operation. Finally, if the client has rights to perform the operation, the system performs the operation on the item of content.

19 Claims, 3 Drawing Sheets

DIGITAL RIGHTS MANAGEMENT PROCESS FLOW

METHOD AND APPARATUS FOR ISSUING RIGHTS IN A DIGITAL RIGHTS MANAGEMENT SYSTEM

RELATED APPLICATION

This application hereby claims priority under 35 U.S.C. §119 to U.S. Provisional Patent Application No. 60/718,064, filed on 16 Sep. 2005, entitled "Open Rights Management Solution," by inventors Gerard M. Fernando, Viswanathan Swaminathan, Thomas W. Jacobs, and William J. Keenan, the contents of which are herein incorporated by reference.

BACKGROUND

1. Field of the Invention

The present invention relates to techniques for accessing digital content. More specifically, the present invention relates to a method and an apparatus for issuing rights in a digital rights management system.

2. Related Art

Most of today's commercial Digital Rights Management (DRM) systems and Conditional Access Solutions (CAS) support flexible content-usage models by delivering a license to a client with express usage rights. However, this technique has significant problems. Since the license with the express rights is stored along with the content, accidental destruction of the content typically destroys the license along with the content. For example, if a consumer purchases the rights to watch a movie on a portable media player, and the player is accidentally dropped into a swimming pool, thus ruining the device, then both the content and the license are probably ruined along with the device. In such cases, it can be very difficult for the consumer to obtain both a new copy of the license and the content to enable the user to view the movie on a new media player without repurchasing the license.

Furthermore, existing DRM systems typically do not work well in situations where the rights for a specific user to access an item of content are revoked. Since the license is typically stored with the content, once the user has the license, the user does not need to contact the license service again. If the license is subsequently revoked, as long as the user does not update the license with the license service, the user can continue to access the item of content.

Existing DRM systems also do not work well with "impulse buying" systems in limited-connectivity environments. For example, if a user is on an airplane and wants to listen to a song or watch a movie that exists on the user's media player, but the user does not currently have a license to access the song or movie, the user is typically denied access to the song or movie, and the user typically does not have a means to purchase a license because of the limited connectivity.

Hence, what is needed is a method and an apparatus for implementing a DRM system without the problems listed above.

SUMMARY

One embodiment of the present invention provides a system that facilitates issuing rights in a digital rights management system. The system operates by sending a request to perform an operation on an item of content from a client to a rights-management server, wherein the request includes a usage parameter which specifies constraints involved in performing the operation. Next, the system receives a response from the rights-management server, wherein the response indicates whether or not the client has rights to perform the operation in accordance with the constraints specified by the usage parameter. Note that the response may also include a hint that facilitates generating subsequent requests to perform the operation. Finally, if the client has rights to perform the operation, the system performs the operation on the item of content.

In a variation on this embodiment, the hint may include a specific usage parameter for the client to use in a subsequent request.

In a variation on this embodiment, if the client does not have a connection to a network that includes the rights-management server, the system sends the request to the rights-management server and receives the response from the rights-management server via a proxy client.

In a variation on this embodiment, if the response is not received from the rights-management server, the system allows the operation to be performed according to a limited usage parameter. The system also records usage statistics involved in performing the operation, and sends the usage statistics to the rights-management server when communication with the rights-management server has been restored.

In a variation on this embodiment, the system periodically sends additional requests to perform the operation to the rights-management server. Sending periodic requests facilitates receiving changes in rights-management policies at the client.

In a variation on this embodiment, the system sends a release request to the rights-management server to release an existing right associated with the item of content at the client. The system also removes the existing right associated with the content at the client such that subsequent requests to perform a subsequent operation on the item of the content at the client that requires the existing right requires the system to re-request rights from the rights-management server prior to performing the subsequent operation on the item of content.

In a variation on this embodiment, the system receives a plurality of commands at the client to perform a plurality of operations on a library of content. In response to these commands, the system creates an aggregated request to perform the plurality of operations on the library of content. Next, the system sends the aggregated request to the rights-management server. Finally, the system receives an aggregated response from the rights-management server, wherein the aggregated response includes individual responses for each operation in the plurality of operations.

In a variation on this embodiment, the operation can include: opening the item of content, playing the item of content, fast-forwarding the item of content, rewinding the item of content, pausing the item of content, copying the item of content, printing the item of content, editing the item of content, performing a cut and paste operation on the item of content, and saving the item of content to a specified medium.

In a variation on this embodiment, the usage parameter can include a number of times the operation can be performed, a length of time the operation can be performed (i.e. for the next two weeks), a time period during which the operation can be performed (i.e. from Nov. 1, 2006, to Nov. 31, 2006), a specific device on which the operation can be performed, and a number of devices on which the operation can be performed.

DETAILED DESCRIPTION

Figure 1:
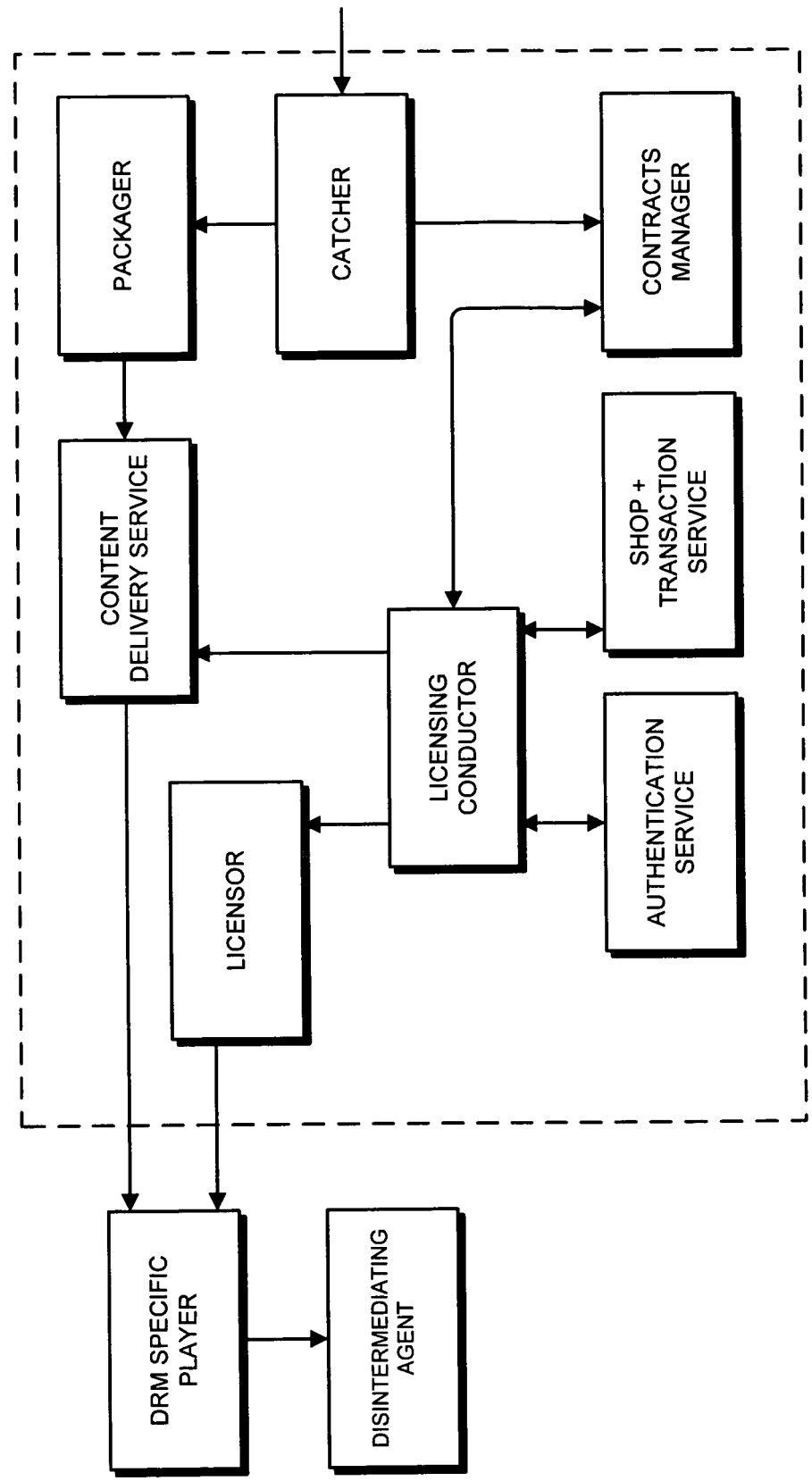
FIG. 1 illustrates a DRM architecture in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention specifies a method that enables a digital rights management (DRM) client to determine rights by interacting with a rights server and for issuing rights to the DRM client. This method is referred to as "Mother May I" (MMI). The Digital Rights Management-MMI (DReaM-MMI) protocol is defined below. For purposes of this description, messages in this protocol are transported using HyperText Transfer Protocol/Secure HyperText Transfer Protocol (HTTP/HTTPS). However, different transport mechanisms may be used for DReaM-MMI instead of HTTP/HTTPS.

The DReaM-MMI specification generally requires profiles to address the specific requirements of different application domains. Therefore, one embodiment of the present invention provides profiles for three application domains: (1) video/music content, (2) documents, and (3) executable applications. However, based on interest, it is possible for more types of profiles to be defined. Within one application domain, different service offerings may be generally defined. If a new application is identified, then the new application may require simply a new service offering. However, if the new application differs sufficiently from supported applications in the DReaM-MMI specification, then this may require a new profile to be defined.

The DReaM-MMI specification is intended to be used for DRM solutions over a range of possible usages. Hence, the DReaM-MMI specification can be used in content/infotainment application areas. In addition, the DReaM-MMI specification can also be used in the business domain, which includes corporate/enterprise, health-care, education, and financial services as well as government and military applications. In the "personal-content/life" category the DReaM-MMI specification can be used to monetize or simply to control access to content, or even to control the behavior of objects. In one embodiment of the present invention, the DReaM-MMI specification defines a message protocol, a message transport mechanism, and a list of profiles. In this embodiment, the DReaM-MMI client may be used in a trusted environment, but it can also function in an untrusted environment.

The DReaM-MMI protocol may be used for direct interaction between a DReaM-MMI enabled client and a license server. Moreover, the DReaM-MMI specification may also be used in an inter-operable framework where the rights management solution is disintermediated, which involves systematically de-coupling authentication, licensing, rights management, and protection technologies.

DRM Architecture Overview

FIG. 1 illustrates a DRM architecture in accordance with an embodiment of the present invention. In this embodiment, the DReaM MMI Client can send DReaM MMIRequest messages to the DReaM Licensor, and can receive and process DReaM MMIResponse messages from the DReaM Licensor. If the DReaM MMI specification is used within a disintermediating architecture, then a common disintermediation agent may be present in the client for the disintermediation process to function. This agent would perform the re-direction required for disintermediation.

The DReaM Licensor supports the DReaM MMI specification, and receives and processes DReaM MMIRequest messages from the DReaM MMI Client. In addition, the DReaM Licensor also sends MMIResponse messages in response to each MMI Request from the DReaM Client.

The Licensing Conductor plays the role of managing the licensing processes involved in the DReaM solution. In order to accomplish this role, the Licensing Conductor has interfaces to the DReaM Client, Shopping and Transaction Service, Authentication Service, Contracts Manager and the Licensor. In addition, the Licensing Conductor performs the necessary e-commerce transactions and authentication of the user. The Licensing Conductor also instructs the Licensor to generate the license for a given user for specific content.

The authentication service is where subscribers, users and devices are cleared for access to services and content. The methods of authentication provided by the authentication service vary from weak methods, such as username+password challenge, to stronger authentications, such as smart cards or biometrics. Note that any authentication method may be used.

The work flow functions of shopping and transacting purchases involve everything from collecting payments from buyers to paying sellers and making sure that everyone is appropriately compensated in a secure manner.

The Contracts Manager stores business rules associated with content, as well as user rights. This component has interfaces to the Licensing Conductor and the Licensor. The Licensor generates a license for a given piece of content based on the business rules and user rights that are available in the Contracts Manager.

DRM Protocol

The following DReaM-MMI Protocol is used in one embodiment of the present invention. However, the present invention is not meant to be restricted to use of the following protocol.

The entities involved in the DReaM-MMI Protocol are the DReaM Client and the DReaM Licensor. Note that the DReaM disintermediating Agent, the DReaM Licensing Conductor, and the DReaM Contracts Manager are optionally involved but are not directly affected by the DreaM-MMI Protocol.

MMI Version

MMI uses a "<major>.<minor>" numbering scheme. This numbering scheme is intended to be similar to the numbering scheme used in HTTP RFC2616. The <major> version number is incremented when the format of any message in the MMI protocol is changed in a way that makes it incompatible with previous versions. The <minor> version number is incremented when the changes do not impact the general message parsing algorithm. Minor versions can extend or change messages in a compatible way.

MMIVersion=1*DIGIT"."1*DIGIT

Any application that uses the version "1.0" should be compliant with this specification.

MMI Messages

There are two types of MMI messages: MMIRequest and MMIResponse. MMIRequest is further categorized into MMIRightsRequest messages and MMRightsRelease messages.

MMIMessage=MMIVersion
        (MMIRequest|MMIResponse)

MMI Request Messages

All transactions are initiated by an MMIRequest message flow from an MMI client to an MMI Server. The characteristics of all MMI messages of the type MMIRequest are specified

---

MMIRequest = MMIMessageType IdentitySegment [DeviceSegment] RightsSegment [SignatureSegment]

--- where, "MMIMessageType" indicates if the message is requesting rights or surrendering previously requested rights. IdentitySegment is used to identify and authorize users and/or their role(s). The IdentitySegment includes all the identity information associated with a user. If a user is already authenticated, the IdentitySegment could include the authentication token (AuthTkn) assigned to an authenticated user in a given session to avoid re-authenticating the user for every MMIRequest.

IdentitySegment=AuthServiceID[AuthTkn]

AuthServiceID is an opaque identifier (URI) that specifies what security service is used for authenticating and/or authorizing the user. This might specify a service provided directly by a standalone server, or some federated third party. AuthTkn is a token assigned by the authentication service (AuthServiceID) when a user is authenticated. After negotiating for this token, AuthTkn is used in all subsequent requests in a given session (till the authentication token expires or till the user explicitly terminates the session). The AuthTkn is base64 encoded. It is assumed that a single userID and one or more roleIDs are associated to each user during the registration process. The authentication process may or may not use the same identifiers in order to protect user privacy. However, it is expected that the license servers can derive user and role Ids associated with the user from the authentication token through appropriately negotiating with the authentication service. DeviceSegment includes all the information about the device or devices with which the user is associated and is requesting rights for. In the simplest case, this includes information about the device or the desktop from which the user is requesting information. However, this could include information about a set of devices which the user is associated with and is requesting rights for. Also, these devices can be tethered or associated with the current device which may or may not connect directly to the network. The DeviceSegment is optional but may be required by certain rights management systems.

DeviceSegment=[LocationID][#DeviceID]

LocationId identifies the geographical location where the user and/or the device(s) are physically located. It is assumed that the LocationID is assigned by the rights management system during the registration process. For example, this may be used to convey the DVD region codes. DeviceID uniquely identifies a given device. This DeviceID is also assigned by the rights management system during the registration process.

RightsSegment encapsulates the actual rights that are either being requested or released and associated information. The actions or verbs for which rights are requested (or released) are contained in the RightsSegment. The definitions of the verbs are specified in the profiles. ProfileID, which is used to identify profiles, is also contained in the RightsSegment. The RightsSegment includes one ProfileID and one or more MMIRightsRequestElements grouped together for transaction optimization purposes.

RightsSegment=ProfileID1*MMIRightsRequestElement

ProfileID uniquely identifies a profile defined in this MMI Specification or a later revision. The identified profile defines the verbs that can be used in this MMIRequest message.

MMIRightsRequestElement represents an atomic rights request element. All the content (or service) and the requested rights information (action and associated terms) is contained within this element.

---

MMIRightsRequestElement = ReqElemID ((1#ContentID
ServiceID) | (1#ServiceID)) 1#VerbElement
VerbElement = VerbElemID Verb [Count] [Duration | Period]
[#VerbSpecificArgs]

---

ReqElemID identifies this request element and has to be unique for this authentication session.

ContentID uniquely identifies the content resource or resources for which rights are requested.

ServiceID uniquely identifies the service for which rights are requested. This is an optional field.

Each MMIRequestElement may include multiple ContentIDs and ServiceIDs, or just any one of the two depending on the information that the service provider requires.

VerbElement is an element that encapsulates a single Verb (defined below) along with arguments for which rights are requested. Multiple Verbs may be associated with a single RequestElement by encapsulating each Verb within a separate VerbElement. The VerbElement may include additional information such as the duration for which the rights to perform the action(verb) is requested, the number of times the action may be performed, and other profile and verb specific fields.

The VerbElement includes the following fields:

VerbElementId—This is an identifier used to distinguish among VerbElements within a MMIRightsRequestElement. VerbElementId should be unique within a MMIRightsRequestElement.

Verb—this is an identifier that represents the action for which rights are requested. These verbs are profile specific and are defined below.

Count—this is the number of times the rights for these verbs are requested (if applicable). For instance, if the verb is Record and the Count is 3, rights are requested for recording the content 3 times.

Period—marks the absolute start and end time within which the content rights should be used. The Period is as defined in [RFC2445] Sec 4.3.9 Period of time.

Duration—This indicates the duration, as defined in [RFC2445] Sec 4.3.6 Duration, in which the content can be consumed.

VerbSpecificArgs—other fields that are relevant to the Verbs. The specific fields that are applicable to a particular verb depend on the profile and are detailed below. It should be noted that MMIRequestElement is an atomic element for which rights are either granted or rejected. Therefore, multiple ContentIDs or multiple VerbElement should be used only if rights are requested as a whole for those multiple ContentIDs.

SignatureSegment—this encapsulates the Signature and associated algorithm information for verifying the Signature. Signature enables the authentication, auditing, verifying message integrity for non repudiation. It is optional, but it may be mandated by the specific service provider. Although this is optional, it is recommended that a Signature mechanism be used especially when the transport is not secure (like HTTP).

The SignatureSegment takes the following form:

SignatureSegment=SigAlg Signature

SigAlg is a URI identifying the signature algorithm used to sign the message. A conforming implementation supports those identifiers and algorithms defined by the XML Signature specification[XMLSigAlg] to be able to verify messages.

Signature digitally signs the entire MMIMessage (including SigAlg field), with the given signature algorithm, using the private key associated with the sender's public key. Signature is base64 encoded.

MMI Rights Request

The MMIRightsRequest messages are used to request usage rights associated with a set of specific content or service. The MMIRightsRequest messages are identified with:

MessageType=MMIRightsRequest

The MMIRightsRequestElements contained in the MMIRightsRequest message are each granted or denied with additional hints. The MMIRightsRequest message can also be responded with an error code.

MMI Rights Release

The MMIRightsRelease messages are used to surrender a previously granted usage rights associated with specific content or services. The MMIRightsRelease messages are identified with MessageType=MMIRightsRelease The response to an MMIRightsRelease message is either a success or failure. The MMIRightsRelease message can also be responded with an error code.

MMI Rights Response

MMI Rights Response is the message used by the Licensor to respond to each MMI Rights Request from the DReaM Client. If the request includes multiple MMI Rights Request Elements, each MMI Request Element is responded with either a grant or a denial contained in a response element. The Request elements and the Response elements are matched with identifiers. In either case (grant or denial), there can be additional hints in the response elements which can optionally be sent by the Licensor. Error codes are used to respond to erroneous MMI Rights requests. Please note that the error codes are not specific to the MMI Rights Request Elements.

All MMI Rights Responses are of the generic form:

MMIRightsResponse = 1#Status 1#<MMIRightsResponsElement> [RequestHashSegment] [ResponseId] SignatureSegment where:

Status is a field that includes information regarding the status of the request. Status is of the form:

Status=GeneralCode|IdentityCode|DeviceCode

The semantics of the Status and the definition of the various status codes are addressed below.

RequestHashSegment encapsulates the hash (and associated algorithm information) of the MMIRightsRequest this is a response to. RequestHashSegment takes the form:

RequestHashSegment=HashAlg RequestHash

HashAlg is a URI identifying the hashing algorithm used to hash the message. A conforming implementation should support those identifiers and algorithms defined by the XML Signature specification[XMLSigAlg].

RequestHash is a digital hash of the MMIRightsRequest that this MMIRightsResponse corresponds to.

ResponseId is an identifier to uniquely identify the response message for auditing purposes.

MMI Rights Response Element is an atomic response element which includes the response to an atomic MMI Rights Request Element and is of the form:

MMIRightsResponseElement = ReqElemId Notification [1#Hint] [Keys] [1#RightsErrorStatus]
RightsErrorStatus = RightsCode where:

ReqElemId—is the same identifier used in the MMI Rights Request Element which this response is associated with Notification="granted"|"denied"|"error"

Granted indicates that the request is granted, while denied indicates the request is denied. An error indicates that there is an error in the MMIRightsRequestElement referred to by ReqElemId. Information about the specific error is available in RightsErrorStatus.

Keys is used to encapsulate content protection keys. Typically, the content symmetric encryption keys are asymmetrically encrypted for the client. Keys should be base64 encoded.

RightsErrorStatus is a RightsCode that is defined in the next section on MMI Status Codes. Note further syntactical rules for RightsErrorStatus. RightsErrorStatus is mandatory if there was an error in processing the MMIRightsRequestElement referred to by ReqElemId, and can be present only when notification="error". Also, when RightsErrorStatus is present, Hint should not be present.

Hint is an optional hint provided by the server as a guideline for future requests. This Hint takes the form:

Hint = HintIndexNum Label [1#ContentId] [1#VerbElement]
Label = ("CanDo" | "CannotDo")

HintIndexNum is the index number associated with this Hint. This has to be unique within the RightsResponseElement. ContentId, VerbElements are as specified in the MMIRequestElement. The Label "CanDo" is used to indicate the rights the user is entitled to, whereas the Label "CannotDo" is used to indicate the reason (VerbElements) that caused the denial of the request. Hint with Label "CannotDo" is used only when the request is denied. It should be noted that when a request is granted the terms of the grant are as specified in the request and not what the Hint indicates. In such cases, Hint is purely used to refine further requests. A user may release the granted rights and re-request using the arguments in the Hint.

MMI Status Codes

The server responds to a MMIRightsRequest with a MMIRightsResponse, which includes a Status field that specifies the status of the request. In case of errors in the original request, the Status field includes one or more codes explaining the reasons for the failure. If there were no errors in the original request, the server should send a "RequestOK" status code in the Status field. Note that even if the Status reports a "RequestOK" message, individual MMIRightsResponseElements may be denied. Also, note that specific RightsCodes cannot be reported in the Status field. RightsCodes can only be reported in the RightsErrorStatus field in the individual MMIRightsResponseElements. Servers that do not want to report specific error messages to the client due to security considerations, may opt to return only non-specific error codes such as Identity Error, Device Error, RightsElementError, RightsParseError etc.

MMI Transport Bindings

A transport binding is needed for sending and receiving MMI messages. This section defines the HTTP bindings.

Http Bindings for MMI

DReaM-MMI servers and clients over HTTP are recommended to use secure transport (HTTPS) to achieve confidentiality and integrity protection. The choice of secure transport is dictated by the security model of the deployment. If https is used, the HTTP connection is made over either SSL 3.0 or TLS1.0. Server-side authentication, if required, uses X.509 certificates. Only one MMI message is sent on one HTTP request (GET or POST).

Pipelining

Clients should not pipeline requests as an MMI request is, typically, non-idempotent. As explained in HTTP 1.1 Section 8.1.2.2 on pipelining, a premature termination of the transport connection could lead to indeterminate results. A client sends a request and waits to receive a response before sending the next request.

DReaM-MMI Client

In one embodiment of the present invention, a DReaM-MMI Client supports the following features: HTTP 1.1 or HTTP 1.0.

HTTP Binding for MMIRightsRequest

The fields of the different segments that make up the MMIRequest, when transported through a HTTP GET or POST should use the following (Java Properties style) names:

```
MMIVersion
MMIMessageType
Identity.AuthServiceId
Identity.AuthTkn
Device.LocationId
Device.DeviceId
Rights.ProfileId
Rights.ReqElem.Id
Rights.<Rights.ReqElem.Id>.ContentId
Rights.<Rights.ReqElem.Id>.ServiceId
Rights.<Rights.ReqElem.Id>.VerbId
Rights.<Rights.ReqElem.Id>.<VerbId>.Verb
Rights.<Rights.ReqElem.Id>.<VerbId>.Count
Rights.<Rights.ReqElem.Id>.<VerbId>.Duration
Rights.<Rights.ReqElem.Id>.<VerbId>.Period
Rights.<Rights.ReqElem.Id>.<VerbId>.<VerbSpecArgs>
Signature.SigAlg
Signature.Signature
```

<Rights.ReqElem.Id> indicates that the value of the Rights.ReqElem.Id field should be substituted wherever <Rights.ReqElem.Id> occurs.

There is no limit on the number of Rights Request Elements that can be sent. Only that each Rights Request Element has a unique ReqElemId (Rights.ReqElem.Id).

MMIRightsRequest Using HTTP GET

The MMI Protocol messages are URL-encoded using the x-www-form-urlencoded MIME type. A sample URL doing an MMI request using HTTP GET would look like this:

```
http://greatcontent.org/myService?MMIVersion=1.0\
&MMIMessageType=MMIRightsRequest\
&Identity.AuthServiceId=www.myAuthService.org\
&Device.DeviceId=123456abc\
&Rights.ProfileId=org.omc.dream.profiles.media\
&Rights.ReqElem.Id=23\
&Rights.23.ContentId=113%2C114%2C115\
&Rights.23.VerbId=1\
&Rights.23.1.Verb=SimplePlay\
&Rights.23.1.Count=1\
&Rights.23.VerbId=2\
&Rights.23.2.Verb=Record\
&Rights.23.2.Count=1
```

Here an MMI Rights Request for content IDs 113, 114 and 115 is being sent out. Permission is requested to SimplePlay and Record the content once (Count=1).

MMIRightsRequest Using HTTP POST

An MMI Rights Request using HTTP POST uses the same field names as specified in HTTP Bindings for MMIRequest. Each name-value pair is sent out on a separate line, without any extra encoding.

```
POST /myService
Host: www.greatcontent.org
Content-type: text/plain
Content-length: nnnn
MMIVersion=1.0
MMIMessageType=MMIRightsRequest
Identity.AuthServiceId=www.myAuthService.org
Device.DeviceId=123456abc
Rights.ProfileId=org.omc.dream.profiles.media
Rights.ReqElem.Id=23
Rights.23.ContentId=113,114,115
Rights.23.VerbId=1
Rights.23.1.Verb=SimplePlay
Rights.23.1.Count=1
Rights.23.VerbId=2
Rights.23.2.Verb=Record
Rights.23.2.Count=1
```

HTTP Binding for MMIRelease

An MMIRightsRelease uses the same elements as those present in MMIRightsRequest. So, the field names as defined in Section 4.1.3 applies here too, without any modifications.

Error Handling

MMI Servers should respond to MMI Protocol errors with a HTTP '200 OK' response and send an MMIRightsResponse as part of the HTTP response body. The MMIRightsResponse includes a status code indicating the nature of the error.

If the HTTP connection is broken before a client receives a response for its MMI request, the client can assume that its request was not processed by the server and no rights were granted or released. The client can choose to repeat the request.

On the server side, if the HTTP connection broke in the process of sending the response out, the server should rollback the rights granted, as if the MMI request was never made. NOTE: In the case of proxies, there is possibly a race condition where the server assumes everything went well and doesn't roll back the granted rights, but the client hasn't received the server's MMI response. In such a case, the client can repeat the MMIRequest with the same ReqElemId and the server should repeat the previous response and not treat it as a new MMIRequest.

Responses to MMI Rights Request/Release

The information that goes in an MMIRightsResponse are identified as below:

```
ResponseId
Status
Signature.SigAlg
Signature.Signature
ReqHash.HashAlg
ReqHash.RequestHash
Response.ReqElemId
Response.<Response.ReqElemId>.Status
Response.<Response.ReqElemId>.Notification
Response.<Response.ReqElemId>.Hint.HintIndexNum
Response.<Response.ReqElemId>.Hint.<HintIndexNum>.Label
Response.<Response.ReqElemId>.Hint.<HintIndexNum>.ContentId
Response.<Response.ReqElemId>.Hint.<HintIndexNum>.ServiceId
Response.<Response.ReqElemId>.Hint.<HintIndexNum>.VerbId
Response.<Response.ReqElemId>.Hint.<HintIndexNum>.<VerbId>.Verb
Response.<Response.ReqElemId>.Hint.<HintIndexNum>.<VerbId>.Count
Response.<Response.ReqElemId>.Hint.<HintIndexNum>.<VerbId>.Duration
Response.<Response.ReqElemId>.Hint.<HintIndexNum>.<VerbId>.<VerbSpecArg>
Response.<Response.ReqElemId>.Keys
```

<field> indicates that the value of the 'field' should be substituted wherever <field> occurs.

An MMIResponse corresponding to the MMIRequest above is given as an example. In the response, the hint field is used to inform the MMIClient that 29 more counts of the "SimplePlay" right are available. The hint may be used by the client to create more efficient requests in future. The Verb "SimplePlay" is interpreted as in the profileID "org.omc.dream.profiles.media" since this profileID was specified in the corresponding MMIRightsRequest:

```
HTTP/1.1 OK
Content-type: text/plain
Content-length: nnnn
ResponseId=1003
MMIVersion=1.0
Status=RequestOK
Response.ReqElemId=23
Response.23.Notification=granted
Response.23.Hint.HintIndexNum=1
Response.23.Hint.1.Label=CanDo
Response.23.Hint.1.ContentIds=113,114,115
Response.23.Hint.1.VerbId=1
Response.23.Hint.1.1.Verb=SimplePlay
Response.23.Hint.1.1.Count=29
Response.23.Keys=OD6Ox9svtSgFJ+iXkZ
ReqHash.HashAlg=http://www.w3.org/2001/10/xml-exc-c14n#
```

-continued

```
ReqHash.RequestHash=jAxX0LfgwutvEdJb748IU4L+8obXPXfq TZ
Signature.SigAlg=http://www.w3.org/2001/10/xml-exc-c15n#
Signature.Signature=OWqP5Gqm8A1+/2b5gNzF4L4L
```

Security Considerations

Message Confidentiality

The confidentiality of the messages in MMI are ensured by either using a secure transport like HTTPS. However, this is optional since the confidentiality requirement may be application dependent. Service providers for commercial services may mandate message confidentiality in all transactions.

Message Authentication

Both Request and Response Messages are authenticated using digital signatures. The signatures are optional as this may be application domain dependent. However, service providers may mandate message authentication in all transactions.

Message Integrity

The integrity of the message can be ensured with generated hashes in the Signature field in both in responses and requests. Again, service providers may mandate message integrity in all transactions.

Profiles

A limited set of profiles are defined in the first version of this MMI specification. These address DRM requirements for Documents, Multimedia (Video, music) content, and Applications. In addition to the above profiles, custom profiles can be created using the Profile Extension Framework discussed at the end of this section.

The definition of a profile includes: (1) Profile Identifier: A profile is identified by a namespace, e.g.: org.omc.dream.media; (2) A brief description of what the profile is intended for; and (3) Base Profile: Service providers and content producers can extend profiles to meet their specific requirements. The Base Profile field serves as a parent pointer to the profile from which the current profile was derived. For profiles that do not have a base profile, the string "TOP_PROFILE" is specified in this field; and (4) Verbs allowed by a profile, and the relevant arguments for each verb. The semantics of the verbs and the arguments have to be explained.

Duration is a generic argument which applies to most of the verbs across different profiles. It indicates the duration for which the verb can be used. To indicate no time limit on the usage of the verb, the request can be made with a special value (depending on time representation) for Duration.

Count is a generic argument which indicates the number of times a verb can be used.

For some Verbs, Duration and Count may not be applicable.

When a Content embeds within it another Content, the embedded Content can either be treated as an independent entity with an independent set of rights or it can simply be subject to the same set of rights as the main or embedding content. However there is no hierarchy or nesting of rights for embedded content.

Profile Extension Framework

New profiles can be defined from scratch as described in the beginning of this section or they can created by extending an existing profile. If created from scratch, the Base Profile includes the TOP_PROFILE string. If extended from an existing profile, the Base Profile includes the Profile Identifier of the existing profile. When extending an existing profile, the existing profile's verbs cannot be overridden in the new profile; however additional verbs can be specified in the new profile.

DRM Process Flow

Figure 2:
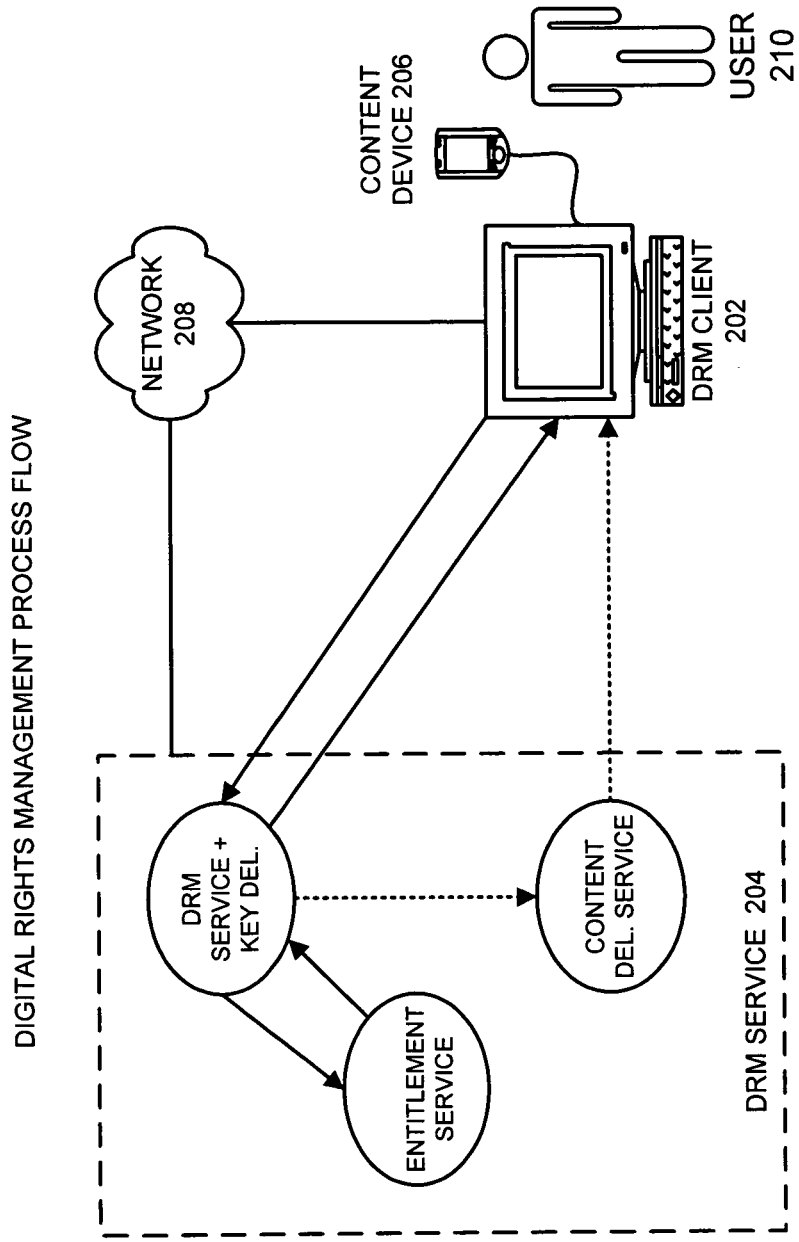
FIG. 2 illustrates the digital rights management process with conditional access in accordance with an embodiment of the present invention.
Figure 3:
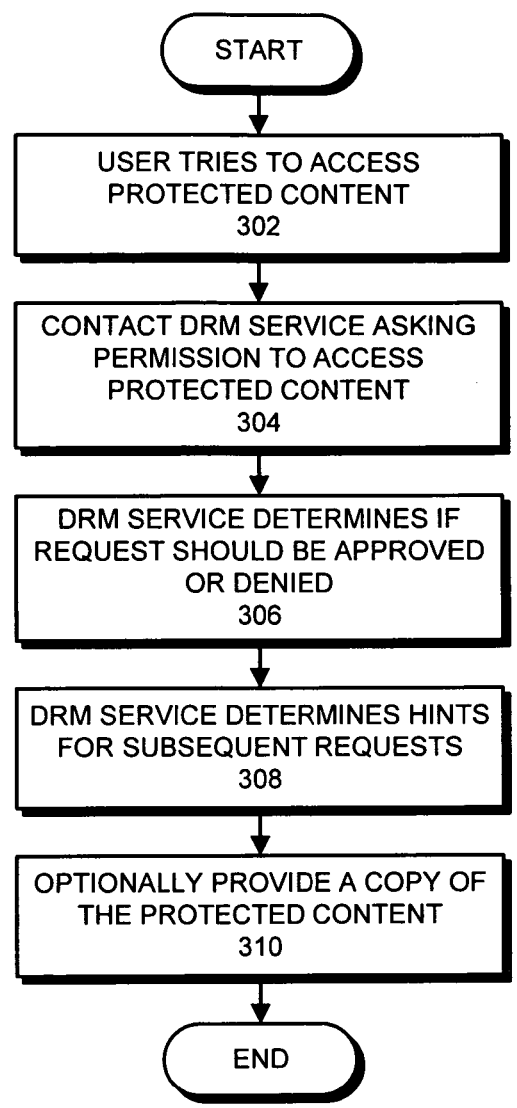
FIG. 3 presents a flowchart illustrating the process of obtaining a license in accordance with an embodiment of the present invention.

FIG. 2 illustrates a digital rights management process flow in accordance with an embodiment of the present invention. FIG. 3 presents a flowchart illustrating the process of obtaining a license in accordance with an embodiment of the present invention. FIG. 2 includes DRM client 202, DRM service 204, content device 206, network 208, and user 210.

DRM client 202 can generally include any node on a network including computational capability and including a mechanism for communicating across the network.

Network 208 can generally include any type of wired or wireless communication channel capable of coupling together computing nodes. This includes, but is not limited to, a local area network, a wide area network, or a combination of networks. In one embodiment of the present invention, network 208 includes the Internet.

DRM client 202 is coupled to DRM service 204 via network 208. Note that DRM client 202 does not need to be continuously coupled to DRM service 204. In one embodiment of the present invention, DRM client 202 is rarely coupled to DRM service 204, and is regularly in an "offline" mode.

In one embodiment of the present invention, user 210 tries to access an item of content on DRM client 202, wherein the item of content is protected by the DRM service 204 (step 302). Next, DRM client 202 contacts DRM service 204 asking permission to access the item of content (step 304). Note that accessing the content may include asking to perform a specific action on the content, such as playing the content, printing the content, copying the content, etc.

Upon receiving the request, the DRM service 204 determines if user 210 has permission to access the content as requested on DRM client 202 (step 306). DRM service 204 also determines additional "hints" to be returned to DRM client 202 for subsequent requests to access the item of content (step 308). For example, if DRM client 202 requests to play an item of content ten times, and user 210 is actually allowed to play the content twenty times, then the hint that accompanies the approval might be "next time ask for another ten plays". Alternatively, if DRM client 202 asks for twenty plays, but user 210 is only allowed ten plays, DRM service 204 might send DRM client 202 a request denied message with a hint that says "next time ask for ten plays."

Also note that in one embodiment of the present invention, a request to DRM service 204, and the corresponding response may include and aggregation of requests and responses, all of which may be approved or denied independently. For example, DRM client 202 may request to play an item of content ten times, and also may request to download the content onto two devices. The corresponding response from DRM service 204 may authorize the ten plays, but deny the downloading requests.

DRM service 204 may optionally provide a copy of the item of content to DRM client 202 (Step 310).

Because the rights for content are kept at the DRM service 204, and the DRM client 202 accesses the service to request rights to the content, DRM service 204 can provide additional options not available in other DRM systems. For example, in one embodiment of the present invention, DRM service 204 allows DRM client 202 to access an item of content a fraction of the number of times that user 210 is actually allowed to access the item of content. In addition, DRM service 204 may require DRM client 202 to contact DRM service 204 at a regular basis to continue to access the item of content. This facilitates disaster recovery should something happen to DRM client 202. If DRM client 202 is destroyed, and user 210 contacts DRM service 204 via a different DRM client, DRM service 204 may simply authorize access on the new DRM client for the remaining uses of the content, or for the same uses authorized for DRM client 202 if DRM client 202 has not contacted DRM service 204 within the specified time period.

In one embodiment of the present invention, DRM client 202 acts as a proxy for content device 206, which cannot directly attach to network 210. Content device 206 can include portable media players, such as mp3 players, cell phones, Personal Digital Assistants (PDAs), or any other device capable of accessing digital content.

In one embodiment of the present invention, the system facilitates impulse buying or accessing of content when DRM client 202 is disconnected from network 210. DRM client 202 may be configured to allow access to an item of content on a limited basis, and to record usage statistics relating to the access of the content. These usage statistics can be provided to DRM service 204 during a subsequent connection to facilitate billing user 210 for the access.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating issuing rights in a digital rights management system, the method comprising:
    sending a request to perform an operation on an item of content from a client to a rights-management server, wherein the request includes a usage parameter which specifies constraints involved in performing the operation, and wherein the usage parameter specifies a requested number of times to access the item of content at the client;
    receiving a response from the rights-management server, wherein the response indicates whether or not the client has rights to perform the operation in accordance with the constraints specified by the usage parameter,
    wherein the response includes a hint from the rights-management server that facilitates generating subsequent requests to perform the operation, wherein the hint comprises an indication of a value for at least one of the constraints for the usage parameter for which the operation could be completed, and wherein the indication of the value comprises a proposed number of times to access the item of content for a subsequent request from the client to the rights-management server;
 if the response indicates that the client does not have the rights to perform the operation:
  using the hint to determine a different set of constraints involved in performing the operation; and
  sending a subsequent request that includes a usage parameter that specifies the different set of constraints; and
 otherwise, if the response indicates that the client has the rights to perform the operation, performing the operation on the item of content.

2. The method of claim 1, wherein the hint may include a usage parameter for the client to use in a subsequent request.

3. The method of claim 1, wherein if the client does not have a connection to a network that includes the rights-management server, sending the request to the rights-management server and receiving the response from the rights-management server involves sending the request and receiving the response via a proxy client.

4. The method of claim 3, wherein if the response is not received from the rights-management server, the method further comprises:
 allowing the operation to be performed according to a limited usage parameter;
 recording usage statistics involved in performing the operation; and
 sending the usage statistics to the rights-management server when communication with the rights-management server has been restored.

5. The method of claim 1, further comprising periodically sending additional requests to perform the operation to the rights-management server, wherein sending periodic requests facilitates receiving changes in rights-management policies at the client.

6. The method of claim 1, further comprising:
 sending a release request to the rights-management server to release an existing right associated with the item of content at the client; and
 removing the existing right associated with the content at the client such that subsequent requests to perform a subsequent operation on the item of the content at the client that requires the existing right requires the client to re-request rights from the rights-management server prior to performing the subsequent operation on the item of content.

7. The method of claim 1, further comprising:
 receiving a plurality of commands at the client to perform a plurality of operations on a library of content;
 creating an aggregated request to perform the plurality of operations on the library of content;
 sending the aggregated request to the rights-management server; and
 receiving an aggregated response from the rights-management server, wherein the aggregated response includes individual responses for each operation in the plurality of operations.

8. The method of claim 1, wherein the operation can include:
 opening the item of content;
 playing the item of content;
 fast-forwarding the item of content;
 rewinding the item of content;
 pausing the item of content;
 copying the item of content;
 printing the item of content;
 editing the item of content;
 performing a cut and paste operation on the item of content; and
 saving the item of content to a specified medium.

9. The method of claim 1, wherein the usage parameter can include:
 a number of times the operation can be performed;
 a length of time the operation can be performed;
 a time period during which the operation can be performed;
 a specific device on which the operation can be performed; and
 a number of devices on which the operation can be performed.

10. A non-transitory computer-readable storage medium storing instructions that when executed by a computer cause the computer to perform a method for facilitating issuing rights in a digital rights management system, the method comprising:
 sending a request to perform an operation on an item of content from a client to a rights-management server, wherein the request includes a usage parameter which specifies constraints involved in performing the operation, and wherein the usage parameter specifies a requested number of times to access the item of content at the client;
 receiving a response from the rights-management server, wherein the response indicates whether or not the client has rights to perform the operation in accordance with the constraints specified by the usage parameter, wherein the response includes a hint from the rights-management server that facilitates generating subsequent requests to perform the operation, wherein the hint comprises an indication of a value for at least one of the constraints for the usage parameter for which the operation could be completed, and wherein the indication of the value comprises a proposed number of times to access the item of content for a subsequent request from the client to the rights-management server;
 if the response indicates that the client does not have the rights to perform the operation:
  using the hint to determine a different set of constraints involved in performing the operation; and
  sending a subsequent request that includes a usage parameter that specifies the different set of constraints; and
 otherwise, if the response indicates that the client has the rights to perform the operation, performing the operation on the item of content.

11. The computer-readable storage medium of claim 10, wherein the hint may include a usage parameter for the client to use in a subsequent request.

12. The computer-readable storage medium of claim 10, wherein if the client does not have a connection to a network that includes the rights-management server, sending the request to the rights-management server and receiving the response from the rights-management server involves sending the request and receiving the response via a proxy client.

13. The computer-readable storage medium of claim 12, wherein if the response is not received from the rights-management server, the method further comprises:
 allowing the operation to be performed according to a limited usage parameter;
 recording usage statistics involved in performing the operation; and
 sending the usage statistics to the rights-management server when communication with the rights-management server has been restored.

14. The computer-readable storage medium of claim 10, wherein the method further comprises periodically sending additional requests to perform the operation to the rights-management server, wherein sending periodic requests facilitates receiving changes in rights-management policies at the client.

15. The computer-readable storage medium of claim 10, wherein the method further comprises:
  sending a release request to the rights-management server to release an existing right associated with the item of content at the client; and
  removing the existing right associated with the content at the client such that subsequent requests to perform a subsequent operation on the item of the content at the client that requires the existing right requires the client to re-request rights from the rights-management server prior to performing the subsequent operation on the item of content.

16. The computer-readable storage medium of claim 10, wherein the method further comprises:
  receiving a plurality of commands at the client to perform a plurality of operations on a library of content;
  creating an aggregated request to perform the plurality of operations on the library of content;
  sending the aggregated request to the rights-management server; and
  receiving an aggregated response from the rights-management server, wherein the aggregated response includes individual responses for each operation in the plurality of operations.

17. The computer-readable storage medium of claim 10, wherein the operation can include:
  opening the item of content;
  playing the item of content;
  fast-forwarding the item of content;
  rewinding the item of content;
  pausing the item of content;
  copying the item of content;
  printing the item of content;
  editing the item of content;
  performing a cut and paste operation on the item of content; and
  saving the item of content to a specified medium.

18. The computer-readable storage medium of claim 10, wherein the usage parameter can include:
  a number of times the operation can be performed;
  a length of time the operation can be performed;
  a time period during which the operation can be performed;
  a specific device on which the operation can be performed; and
  a number of devices on which the operation can be performed.

19. An apparatus for facilitating issuing rights in a digital rights management system, comprising:
  a sending mechanism configured to send a request to perform an operation on an item of content from a client to a rights-management server, wherein the request includes a usage parameter which specifies constraints involved in performing the operation, and wherein the usage parameter specifies a requested number of times to access the item of content at the client;
  a response mechanism configured to receive a response from the rights-management server, wherein the response indicates whether or not the client has rights to perform the operation in accordance with the constraints specified by the usage parameter, wherein the response includes a hint from the rights-management server that facilitates generating subsequent requests to perform the operation, wherein the hint comprises an indication of a value for at least one of the constraints for the usage parameter for which the operation could be completed, and wherein the indication of the value comprises a proposed number of times to access the item of content for a subsequent request from the client to the rights-management server; and
  an execution mechanism, wherein if the response indicates that the client does not have the rights to perform the operation, the execution mechanism is configured to:
    use the hint to determine a different set of constraints involved in performing the operation; and to
    use the sending mechanism to send a subsequent request that includes a usage parameter that specifies the different set of constraints; and
  wherein if the response indicates that the client has the rights to perform the operation, the execution mechanism is configured to perform the operation on the item of content.

* * * * *